Jan. 1, 1935.  A. Y. DODGE  1,986,428
CONNECTION
Filed April 16, 1932  3 Sheets-Sheet 2

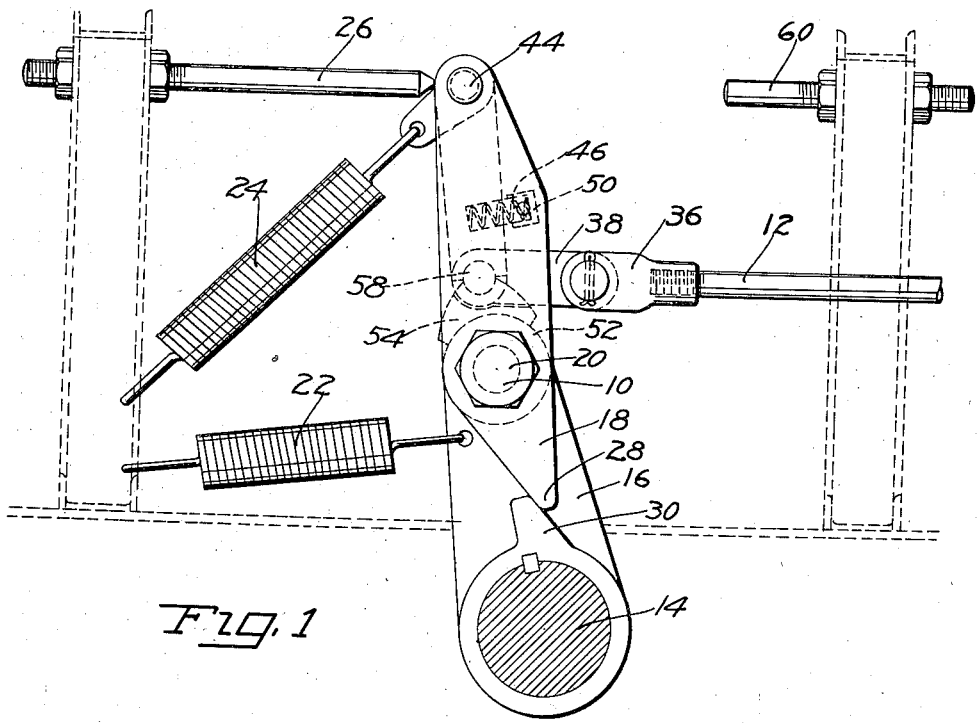
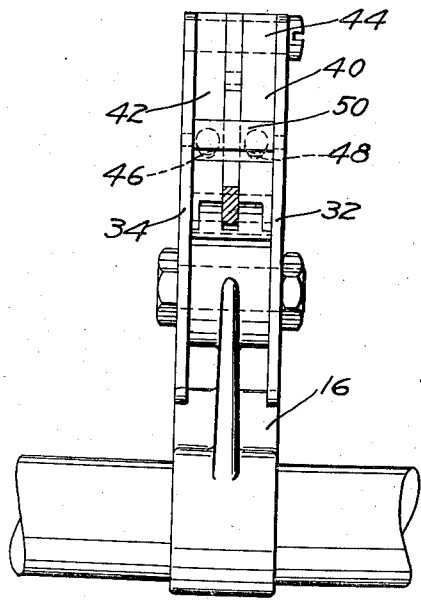

INVENTOR.
ADIEL Y. DODGE
BY
ATTORNEY

Jan. 1, 1935.  A. Y. DODGE  1,986,428
CONNECTION
Filed April 16, 1932  3 Sheets-Sheet 3

INVENTOR.
ADIEL Y. DODGE
BY
ATTORNEY.

Patented Jan. 1, 1935

1,986,428

UNITED STATES PATENT OFFICE 1,986,428

CONNECTION

Adiel Y. Dodge, South Bend, Ind., assignor to Bendix Aviation Corporation, South Bend, Ind., a corporation of Delaware Application April 16, 1932, Serial No. 605,733

14 Claims. (Cl. 74—518)

This invention relates to brakes and more particularly to a novel actuating linkage therefor.

In the operation of automotive brakes, constant wear takes place which steadily permits the brake shoes to gradually be applied closer and closer to the drum. Since the manual control for these brakes necessarily must have a limited range of movement all of which is needed to actuate the brake as a result of the mechanical advantage involved, it is constantly necessary to adjust the brakes individually for wear. In order to do away with this disadvantage it is proposed to use an automatic linkage which will operate at low mechanical advantage to rapidly take up the brake clearance and slack, and which will automatically operate at a high mechanical advantage as soon as actual braking action and resistance to further pedal movement commences. Thus but a small portion of the manual control range will be used to take up slack and clearance, and leave the remainder of the range for brake actuation.

Accordingly it is an object of the invention to provide a brake linkage so constructed as to have the advantages above desired.

Another object of the invention is to provide a brake linkage which will operate at low mechanical advantage during slack and clearance takeup, and will automatically shift to high mechanical advantage upon resistance to further movement.

Still another object is to provide a novel linkage capable of producing a low mechanical advantage, when such is adequate, and producing a high mechanical advantage automatically when such is required.

A further object of the invention is the provision of control linkage in combination with a brake which operates to take up all brake clearance and slack upon a slight movement of the control member, and which may effectually operate the brakes upon further movement.

A still further object of the invention is the provision of a single readily adaptable and compact structure for accomplishing the objects heretofore referred to.

The above and other novel features of the invention will appear more fully hereinafter from the following detailed description when taken in conjunction with the accompanying drawings. It is expressly understood however, that the drawings are employed for purposes of illustration only and are not designed as a definition of the limits of the invention, reference being had for this purpose to the appended claims.

In the drawings, wherein similar reference characters refer to similar parts throughout the several views;

Figure 1 is a side elevation of one form of the invention;

Figure 2 is an elevation of the right hand end of the form of the invention illustrated in Figure 1;

Figure 3:
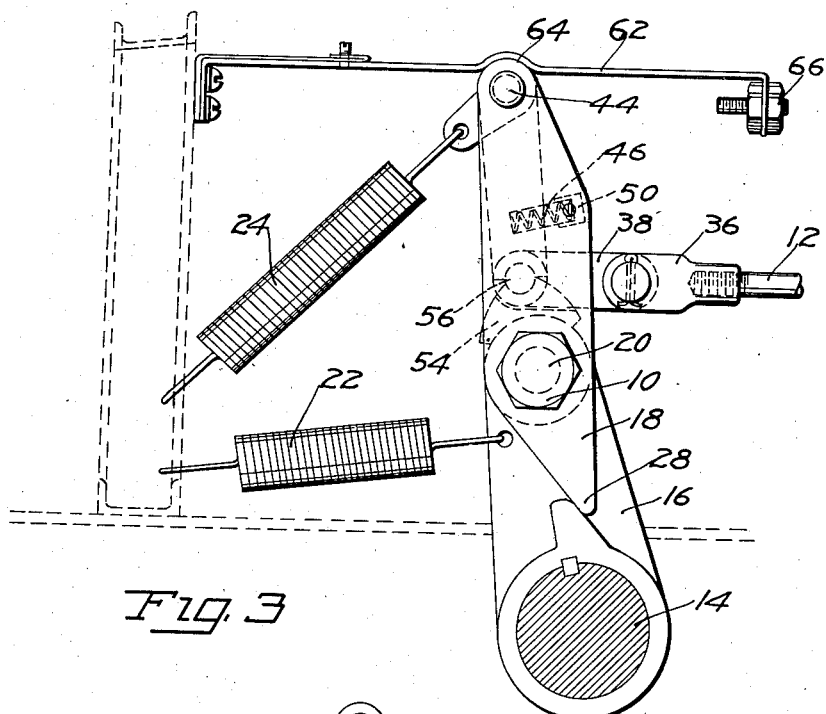
Figure 3 is a side elevation of a slightly modified form of the invention shown in Figure 1.

Referring more particularly to Figures 1 and 2 it will be seen that there is provided a novel lever mechanism 10 connecting the brake actuating rod 12 with a cross shaft 14 to which the brakes are customarily operatively connected. A crank arm 16 keyed to the shaft 14 carries thereon a link 18 pivoted at 20. Resilient springs 22 and 24 and a stop 26 maintain the lever normally in proper neutral position, in which position the tip 28 of the lever 20 engages the shoulder 30 upon the crank hub. As is readily observable in Figure 2, the lever 18 is made up of a pair of plates 32 and 34 between which is placed the crank 16 and a toggle mechanism presently to be referred to.

In order to actuate the lever, the actuating rod 12 is provided with a clevis 36 which embraces a link 38 extending in between the sides 32 and 34 of the lever. A pair of links 40 and 42 pivoted at 44 are adapted to receive the link 38. Movement of the links 40 and 42 is resiliently controlled by the springs 46 and 48 mounted in the cross piece 50, which acts as a stop upon compression of the springs beyond a certain limit.

As may be observed in Figure 1, the end of the crank 16 is provided with a smooth curved surface 52 and in engagement therewith is a friction shoe 54. The shoe is pivoted at 56 together with the link 38 and links 40 and 42. The links 40 and 42 and shoe 54 are so constructed as to form a toggle, which toggle functions upon movement of the links 40 and 42 to compress the springs 46 and 48. The cross piece 50 prevents the toggle from passing the straight or nearly straight position. Accordingly, it will be readily understood that upon a light pull upon rod 12, links 40 and 42 through springs 46 and 48 will rock the lever 18 about the support 26 and cause the crank 16 to rotate. Should the crank resist rotation so that tension upon rod 12 becomes sufficient to compress springs 46 and 48 materially, the toggle straightens out applying the friction member 54 upon the crank end, thus causing the lever and crank to lock together and thereafter operate as a single lever. Should any part become worn so that the friction member would fail to lock the lever and crank together, the link 40 would ultimately abut the cross piece 50, and the lever would turn until the tip 28 engaged the shoulder 30 and accordingly the mechanism would act as a single crank. A second adjustable stop 60 may be provided to unlock the lever 18 from the crank 16 towards the end of the range of movement thereof.

The modification shown in Figure 3 is similar in all respects to that of Figures 1 and 2 except that a resilient member 62 is supplied with a recess 64 and an adjustable stop 66 in place of the abutments 26 and 60 shown in Figure 1.

Figure 4:
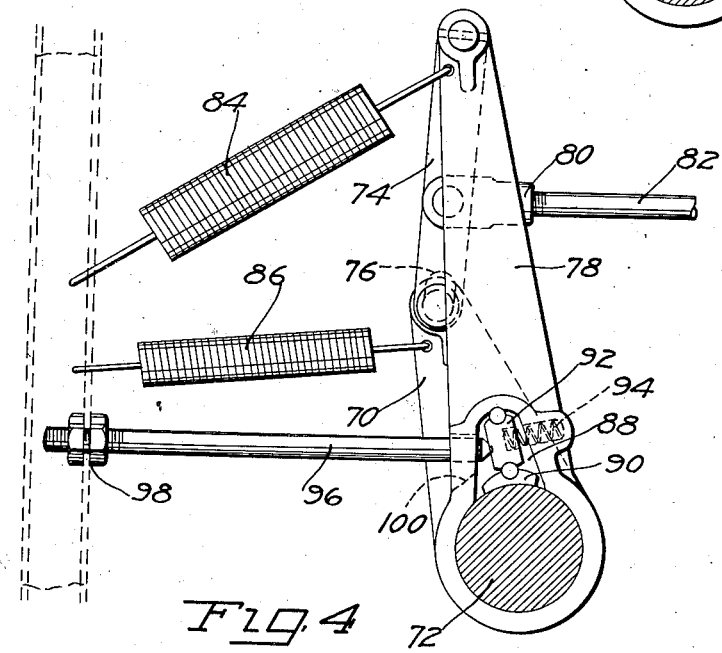
Figure 4 is a modified construction of the linkage.

A similar mechanism for performing the same function is illustrated in Figure 4, wherein a pair of cranks of different length and a radially extending link is utilized to connect them. As shown, a short crank 70 is keyed to the rock shaft 72, and is connected by a link 74 slotted at 76 to a long crank 78, which crank is not keyed to the rock shaft. A clevis 80 and pull rod 82 may be provided to actuate the mechanism and pull on the link 74. Tension springs 84 and 86 are employed for the purpose of normally urging the mechanism to neutral position. Within a recess 88 provided in the crank 78 is a friction shoe 90, adapted for frictional engagement with the shaft 72, and urged into such engagement by a toggle link 92 and spring 94 upon clockwise rotation of the crank relative to the shaft. An abutment 96 preferably adjustably mounted as at 98 is adapted to pass through an aperture 100 in the crank 78 and engage the toggle link 92 so as to prevent engagement of the shoe 90 when in the position shown. However, upon a sufficient pull upon the rod 82, the long crank 78 may be rocked against the tension of the spring 84, and release the toggle link 92 from the effect of the abutment 96, thereby permitting locking of the crank to the shaft.

Figure 5:
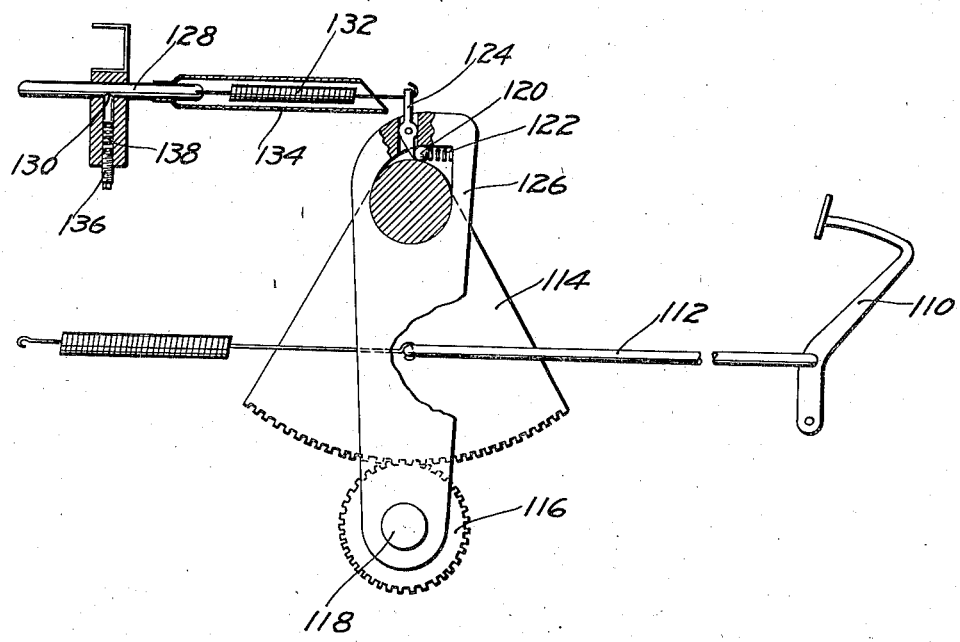
Figure 5 is a modified construction of the linkage utilizing a sector gear and pinion.

A further modification employing a sector gear and pinion is illustrated in Figure 5. In the structure shown, there may be provided the usual brake pedal 110, and rod 112 adapted to rock a sector gear 114. Engaged with the sector gear is a pinion 116 keyed to the rock shaft 118. A link 126, freely pivoted on shaft 118 supports the sector gear pivot in proper relation to the pinion.

To prevent rotation of the sector gear relative to its supporting link, a roller clutch 120 with a compression spring 122 may be provided as shown. To restrict the operation of this clutch to the range of movement requiring high pedal pressure, a small lever 124 is provided to hold the roller out of engagement with the sector gear shaft, until such time as the pull on the link 126 becomes sufficient to slip the pin 128 from its catch 130. For this purpose, it is preferable to employ a tension spring 132 intermediate the lever 124 and the pin 128. To reengage the pin with its catch 130, a sleeve 134 is provided which may engage the projecting lever upon return movement of the link 126, thereby driving the pin back into place. The force required to free the pin 128 from its catch 130 may be varied by the adjustment screw 136 which presses against a spring 138.

Any of the springs utilized in the various modifications may be of the type having normal internal tension holding the coils together, or the equivalent thereof. Such a spring affords the properties of a solid link until a certain tension is reached and thereupon a yielding link of slowly increasing resistance.

The operation of the modifications of Figures 1, 2, and 3 may be readily understood as follows: Upon tension being applied to rod 12, the links 40 and 42 swing on the pivot 44. Through the springs 46 and 48, this swinging movement tends to swing lever 32 about the support 26 counterclockwise, and hence rotate the crank 16 clockwise. If and when the crank offers substantial resistance to movement, the springs 46 and 48 will be compressed, permitting the toggle to frictionally engage the shoe 54 with the crank, and thereupon lever 32 will become locked to the crank and increase the effective length thereof, and further movement will move lever 32 from the abutment 26 until engaged by the abutment 60.

The structure of Figure 4 operates similarly, a pull on rod 82 tending to swing link 74 about its connection with crank 78, and thus rotate crank 70. The spring 84 holds the crank 78 substantially stationary so long as the force applied to rod 82 is light. As soon as resistance is offered to movement of shaft 72, the spring 84 yields and crank 78 rotates, thereupon disengaging toggle link 92 from the abutment 96 and thus permitting the toggle to frictionally connect crank 78 to shaft 72 whereupon the whole mechanism operates as a single crank.

Operation of the arrangement shown in Figure 5 depends upon the principles already mentioned. Tension is applied to the rod 112 which tends to rotate the sector gear 114, and in turn gear 116 and shaft 118. As long as the shaft 118 offers little or no resistance to rotation, the link 126 is maintained in the position shown by means of the spring and pin 132 and 128 and catch 130. This linkage acts through a lever maintaining the clutch roller 120 out of engagement against the urge of the spring 122. Upon increased resistance the catch 130 is no longer sufficient to resist the reaction moment of the link 126 and releases the pin 128, whereupon the roller engages the sector gear and causes the mechanism to act as a single crank about shaft 118. Upon return movement, the pin 128 is returned upon sleeve 134 engaging lever 124.

Though several embodiments and modifications of the invention have been illustrated and described, it is to be understood that the invention is not limited thereto but may be embodied in various mechanical forms. For example, gears may be substituted for levers or vice versa, as may be apparent from the modification of Figure 5 and the other modifications shown. As such changes in construction and arrangement of parts may be made without departing from the spirit of the invention, as will be apparent to those skilled in the art, reference will be had to the appended claims for a definition of the limits of the invention.

This application is a continuation in part of my co-pending application Serial No. 341,978, filed February 23, 1929.

I claim:

1. An actuating linkage comprising a pair of cranks of different length rotatable about a common axis, a substantially radially extending slotted link connecting the ends of said cranks, a pull rod secured to said link intermediate the ends, a shaft secured to the shorter of said cranks, and clutch means adapted to secure the longer of said cranks to said shaft, said clutch means including mechanism to actuate said clutch upon the application of tension to said rod in excess of a predetermined amount.

2. A rock shaft, a short crank fixed thereto, a long crank rockable thereon, a substantially radial link pivotally connecting said cranks, a tension member secured to said link intermediate the ends thereof, and positive means mounted upon one of said cranks for preventing relative movement between said cranks upon a substantial resistance to turning being applied to said rock shaft.

3. A rock shaft, a short crank fixed thereto, a long crank rockable thereon, a substantially radial link pivotally connecting said cranks, a tension member secured to said link intermediate the ends thereof, and positive means mounted upon one of said cranks for preventing relative movement between said cranks upon an increase in tension in said tension member above a predetermined amount.

4. Actuating linkage comprising a crank, a lever of the third class adapted to actuate said crank and located substantially beyond the end of the crank, and means for rigidly securing said lever and crank against relative movement, upon substantial resistance being offered to movement of said crank.

5. Actuating mechanism comprising a crank, a lever extending beyond the end of and pivotally mounted upon said crank and adapted to actuate said crank, and means acting upon an increase of resistance to rotation of said crank to lock said lever and crank together to effectually form a single crank.

6. Operating mechanism comprising a tension rod, a sector gear actuated thereby, a pinion in engagement with the sector gear and secured to a rock shaft, links means pivoted upon said rock shaft and pivotally supporting said sector gear and an overrunning clutch preventing relative rotation between said sector gear and said links in one direction, and means for engaging said clutch when said rod is under tight tension.

7. Operating mechanism comprising a rock shaft, a short crank arm secured thereto, a long crank arm having overrunning engagement therewith, a clutch for effecting said engagement, a substantially radial extending link connecting said cranks and carrying an actuating member, and means for maintaining said clutch in released position during light resistance to rotation of said rock shaft.

8. A crank, a lever pivoted thereon and forming a crank extension, an abutment for said lever at its outer end, means for rocking said lever on said abutment during light tension thereof, and for rocking said lever as a part of said crank during substantial tension on said means.

9. A crank, a lever pivoted thereon and forming a crank extension, an abutment for said lever at its outer end, means for rocking said lever on said abutment, and a second means associated with the first means for locking said lever to said crank upon a substantial increase in tension applied to said first named means.

10. A short crank, a rock shaft secured thereto, a long crank having an overrunning connection therewith, a clutch for effecting said engagement, a substantially radial extending link connecting said cranks, return means for said long crank and means to disengage said clutch when said long cranks rests in return position.

11. Operating mechanism comprising, in combination, a part to be operated, a lever movably mounted on said part, a member fixed on said part, a second member movably mounted on the lever and operatively engaging the first member, and means constraining the lever and said two members to turn individually until a substantial resistance to the movement of said part is encountered, the constraining means yielding under substantial resistance to permit the first member and the second member to turn as a unit.

12. Operating mechanism comprising, in combination, a part to be operated, a lever movably mounted on said part, a gear fixed on said part, a second gear movably mounted on the lever and meshing with said first gear, and means constraining the lever and said two gears to turn individually until a substantial resistance to the movement of said part is encountered, the constraining means yielding under substantial resistance to permit the first gear and the second gear to act as a unit.

13. Operating mechanism comprising, in combination, a part to be operated, a lever movably mounted on said part, a member fixed on said part, a second member movably mounted on the lever and operatively engaging the first member, and means comprising a spring constraining the lever and said two members to turn individually until a substantial resistance to the movement of said part is encountered, the constraining means yielding under substantial resistance to permit the first member and the second member to turn as a unit.

14. Operating mechanism comprising, in combination, a part to be operated, a lever movably mounted thereon, a member fixed thereon, a second member movably mounted on the lever and operatively engaging the first member, and a tensioned spring having one end fixed and the other connected to said lever constraining the lever and said two members to turn individually until a substantial resistance to the movement of said part is encountered and which then yields to permit the second member and the first member to turn as a unit.

ADIEL Y. DODGE.